United States Patent
Meir et al.

(10) Patent No.: US 9,753,644 B2
(45) Date of Patent: Sep. 5, 2017

(54) MEMORY MANAGEMENT SCHEMES FOR NON-VOLATILE MEMORY DEVICES

(71) Applicant: Apple Inc., Cupertino, CA (US)

(72) Inventors: Avraham Meir, Rishon Lezion (IL); Oren Golov, Hod-Hasharon (IL)

(73) Assignee: Apple Inc., Cupertino, CA (US)

( * ) Notice: Subject to any disclaimer, the term of this patent is extended or adjusted under 35 U.S.C. 154(b) by 49 days.

(21) Appl. No.: 14/164,706

(22) Filed: Jan. 27, 2014

(65) Prior Publication Data

US 2014/0143483 A1 May 22, 2014

Related U.S. Application Data

(62) Division of application No. 12/963,649, filed on Dec. 9, 2010, now Pat. No. 8,677,054.

(60) Provisional application No. 61/326,858, filed on Apr. 22, 2010, provisional application No. 61/286,814, filed on Dec. 16, 2009.

(51) Int. Cl.
*G06F 12/00* (2006.01)
*G06F 3/06* (2006.01)
*G06F 12/02* (2006.01)

(52) U.S. Cl.
CPC ............ *G06F 3/0604* (2013.01); *G06F 3/065* (2013.01); *G06F 3/0619* (2013.01); *G06F 3/0631* (2013.01); *G06F 3/0643* (2013.01); *G06F 3/0679* (2013.01); *G06F 12/0246* (2013.01)

(58) Field of Classification Search
CPC ........ G06F 3/0619; G06F 3/065; G06F 12/00; G06F 12/0246
USPC ................ 711/103, 151, 158, 159; 707/817
See application file for complete search history.

(56) References Cited

U.S. PATENT DOCUMENTS

| | | | |
|---|---|---|---|
| 6,615,326 B1 | 9/2003 | Lin | |
| 7,093,094 B2 | 8/2006 | Cismas | |
| 7,246,209 B2 * | 7/2007 | Tran et al. | 711/159 |
| 8,677,054 B1 * | 3/2014 | Meir et al. | 711/103 |
| 2003/0161002 A1 * | 8/2003 | Nishiwaki et al. | 358/1.15 |
| 2006/0106980 A1 * | 5/2006 | Kobayashi et al. | 711/113 |
| 2006/0112240 A1 | 5/2006 | Walker | |
| 2006/0146589 A1 * | 7/2006 | Karlsson et al. | 365/145 |
| 2007/0220153 A1 * | 9/2007 | Veerapuneni | 709/227 |
| 2008/0059692 A1 | 3/2008 | Erez | |
| 2009/0300134 A1 * | 12/2009 | Smith et al. | 709/216 |
| 2009/0327623 A1 | 12/2009 | Ochiai | |

(Continued)

*Primary Examiner* — Reginald Bragdon
*Assistant Examiner* — Mehdi Namazi
(74) *Attorney, Agent, or Firm* — Meyertons, Hood, Kivlin, Kowert & Goetzel, P.C.

(57) ABSTRACT

A method includes storing data in a non-volatile memory that includes multiple memory blocks. At least first and second regions are defined in the non-volatile memory. A definition is made of a first over-provisioning ratio between a first logical address space and a first physical memory space of the first region, and a second over-provisioning ratio, different from the first over-provisioning ratio, between a second logical address space and a second physical memory space of the second region. Portions of the data are compacted, individually within each of the first and second regions and independently of the other region, by copying the portions from one or more source memory blocks to one or more destination memory blocks using the first and second over-provisioning ratios, respectively.

8 Claims, 5 Drawing Sheets

(56) References Cited

U.S. PATENT DOCUMENTS

2012/0167110 A1\* 6/2012 Mizuno ................ G06F 9/5083
718/103

\* cited by examiner

MEMORY MANAGEMENT SCHEMES FOR NON-VOLATILE MEMORY DEVICES

CROSS-REFERENCE TO RELATED APPLICATIONS

This application is a divisional of U.S. Pat. No. 8,677,054, filed Dec. 9, 2010 which claims the benefit of U.S. Provisional Patent Application 61/326,858, filed Apr. 22, 2010, and U.S. Provisional Patent Application 61/286,814, filed Dec. 16, 2009, whose disclosures are incorporated herein by reference.

FIELD OF THE INVENTION

The present invention relates generally to data storage, and particularly to memory management in non-volatile storage devices.

BACKGROUND OF THE INVENTION

Some storage devices, such as Solid-State Disks (SSD), use arrays of analog memory cells for non-volatile data storage. Each analog memory cell stores a quantity of an analog value, also referred to as a storage value, such as an electrical charge or voltage. This analog value represents the information stored in the cell. In Flash memories, for example, each analog memory cell holds a certain amount of electrical charge. The range of possible analog values is typically divided into intervals, each interval corresponding to one or more data bit values. Data is written to an analog memory cell by writing a nominal analog value that corresponds to the desired bit or bits.

Some memory devices, commonly referred to as Single-Level Cell (SLC) devices, store a single bit of information in each memory cell, i.e., each memory cell can be programmed to assume two possible programming levels. Higher-density devices, often referred to as Multi-Level Cell (MLC) devices, store two or more bits per memory cell, i.e., can be programmed to assume more than two possible programming levels.

SUMMARY OF THE INVENTION

An embodiment of the present invention that is described herein provides a method, including:

storing data in a non-volatile memory that includes multiple memory blocks;

defining at least first and second regions in the non-volatile memory;

defining a first over-provisioning ratio between a first logical address space and a first physical memory space of the first region, and defining a second over-provisioning ratio, different from the first over-provisioning ratio, between a second logical address space and a second physical memory space of the second region;

individually within each of the first and second regions and independently of the other region, compacting portions of the data by copying the portions from one or more source memory blocks to one or more destination memory blocks using the first and second over-provisioning ratios, respectively.

In some embodiments, defining the first and second regions includes assigning the first region for storing parts of the data that change at a first frequency, and assigning the second region for storing portions of the data that change at a second frequency, smaller than the first frequency. In an embodiment, the method includes setting the first over-provisioning ratio to be larger than the second over-provisioning ratio.

In a disclosed embodiment, defining the first and second regions includes assigning the first region for storing frequently-changing data, and assigning the second region for storing rarely-changing data. In another embodiment, the first region is used for storing a computer file that is known to change frequently. In an embodiment, defining the first region includes detecting storage locations of the non-volatile memory in which the computer file is stored.

In some embodiments, defining the first and second regions includes assigning the first region for storing parts of the data that are written sequentially, and assigning the second region for storing portions of the data that are written non-sequentially. In an embodiment, the method includes modifying at least one of the first and second over-provisioning ratios over time. In another embodiment, compacting the portions of the data includes choosing the source memory blocks based on a selection criterion that equalizes wear of the non-volatile memory.

In yet another embodiment, storing the data includes accepting commands to store the data in logical addresses, translating the logical addresses into respective physical storage locations in the non-volatile memory and storing the data in the physical storage locations, and the method includes modifying translation of the logical addresses into the physical storage locations based on a criterion that equalizes wear of the non-volatile memory.

There is additionally provided, in accordance with an embodiment of the present invention, a method, including:

accepting from a host data belonging to a host data-set;

identifying, independently of the host, a portion of the data as belonging to a pre-specified host data-set item;

storing the identified portion in a non-volatile memory using a first number of bits per memory cell; and storing the data other than the identified portion in the non-volatile memory using a second number of bits per memory cell, higher than the first number.

In some embodiments, the host data-set includes computer files, and the pre-specified host data-set item includes a pre-specified computer file. In an embodiment, identifying the portion includes automatically detecting that the portion of the data belongs to the pre-specified host data-set item without receiving from the host any notification that relates the portion of the data to the pre-specified host data-set item.

There is also provided, in accordance with an embodiment of the present invention, a method, including:

in a memory controller that stores data for a host in a memory, defining independently of the host execution priorities for two or more types of memory access tasks to be applied to the memory;

accepting multiple un-prioritized memory access tasks submitted by the host to the memory controller, each of the accepted memory access tasks belonging to a respective one of the types; and applying the accepted memory access tasks to the memory in accordance with the defined execution priorities responsively to the respective types.

In some embodiments, defining the execution priorities includes giving precedence to memory readout tasks over tasks other than the memory readout tasks. In a disclosed embodiment, defining the execution priorities includes giving precedence to the memory access tasks relating to selected storage addresses over the memory access tasks relating to storage addresses other than the selected storage addresses. In another embodiment, defining the execution priorities includes giving precedence to the memory access tasks relating to a selected file type over the memory access tasks relating to file types other than the selected file type.

In yet another embodiment, defining the execution priorities includes causing the memory controller to execute a sequence of consecutive memory access tasks belonging to a given type. In an embodiment, causing the memory controller to execute the sequence includes queuing subsets of the memory access tasks belonging to the respective types in respective type-specific queues, and executing the sequence of the consecutive memory access tasks drawn from one of the type-specific queues. In an embodiment, defining the execution priorities includes modifying the execution priorities over time.

There is further provided, in accordance with an embodiment of the present invention, a method, including:

accepting from a host a computer file, and storing the computer file in a non-volatile memory;

identifying, automatically and independently of the host, a region of the non-volatile memory that holds a portion of the computer file that is not utilized by the host; and releasing the identified region for use in management of the non-volatile memory while continuing to hold the computer file in the non-volatile memory.

In some embodiments, the computer file indicates attributes of other computer files stored in the non-volatile memory, and identifying the region includes identifying null entries in the computer file. In a disclosed embodiment, releasing the region includes assigning the released region to serve as over-provisioning memory space.

There is additionally provided, in accordance with an embodiment of the present invention, apparatus, including:

an interface, which is configured to accept data for storage in a non-volatile memory; and a processor, which is configured to define at least first and second regions in the non-volatile memory, to define a first over-provisioning ratio between a first logical address space and a first physical memory space of the first region, to define a second over-provisioning ratio, different from the first over-provisioning ratio, between a second logical address space and a second physical memory space of the second region, and, individually within each of the first and second regions and independently of the other region, to compact portions of the data by copying the portions from one or more source memory blocks to one or more destination memory blocks using the first and second over-provisioning ratios, respectively.

There is also provided, in accordance with an embodiment of the present invention, apparatus, including:

an interface, which is configured to accept from a host data belonging to a host data-set for storage in a non-volatile memory; and a processor, which is configured to identify, independently of the host, a portion of the data as belonging to a pre-specified host data-set item, to store the identified portion in the non-volatile memory using a first number of bits per memory cell, and to store the data other than the identified portion in the non-volatile memory using a second number of bits per memory cell, higher than the first number.

There is further provided, in accordance with an embodiment of the present invention, apparatus, including:

an interface, which is configured to accept from a host memory access tasks for execution in a memory; and a processor, which is configured to define, independently of the host, execution priorities for two or more types of the memory access tasks, to accept multiple un-prioritized memory access tasks submitted by the host, each of the accepted memory access tasks belonging to a respective one of the types, and to apply the accepted memory access tasks to the memory in accordance with the defined execution priorities responsively to the respective types.

There is also provided, in accordance with an embodiment of the present invention, apparatus, including:

an interface, which is configured to accept from a host a computer file for storage in a non-volatile memory; and a processor, which is configured to store the computer file in the non-volatile memory, to identify, automatically and independently of the host, a region of the non-volatile memory that holds a portion of the computer file that is not utilized by the host, and to release the identified region for use in management of the non-volatile memory while continuing to hold the computer file in the non-volatile memory.

The present invention will be more fully understood from the following detailed description of the embodiments thereof, taken together with the drawings in which:

DETAILED DESCRIPTION OF EMBODIMENTS

Overview

Figure 1:
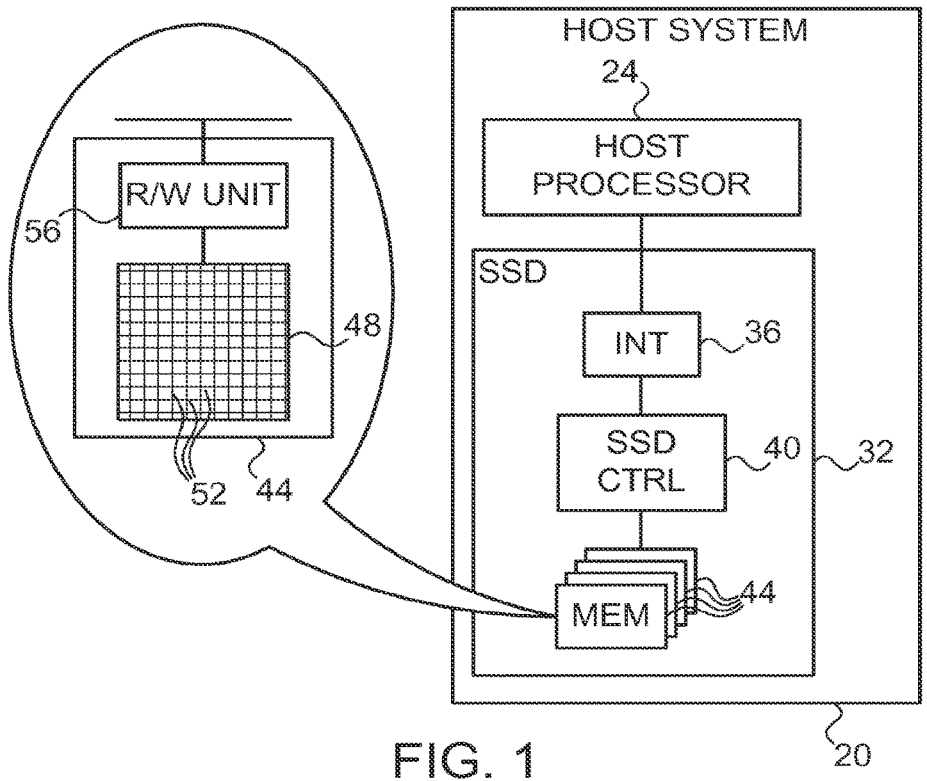
FIG. 1 is a block diagram that schematically illustrates a memory system, in accordance with an embodiment of the present invention.

Embodiments of the present invention provide improved methods and systems for memory management in memory systems comprising non-volatile memory devices. Although the embodiments described herein refer mainly to management of Solid State Disks (SSDs) by SSD controllers, the disclosed techniques can be applied in various other kinds of memory systems and by various other types of memory controllers.

In some of the disclosed techniques, a memory controller stores data in a non-volatile memory that includes multiple memory blocks. The memory controller applies a compaction ("garbage collection") process that copies valid data from partially-filled memory blocks to new storage locations in order to clear memory blocks for erasure and new programming. In some embodiments, the memory controller defines two or more regions in the non-volatile memory, and carries out the compaction process separately and independently in each region. In an embodiment, the memory controller maintains different over-provisioning ratios (i.e., different ratios between the true physical capacity and of the memory and the capacity available to the host) in different regions. This technique is useful, for example, for assigning a high over-provisioning ratio to regions that store frequently-changing data, and a lower over-provisioning ratio to regions that store rarely-changing data.

In other disclosed techniques, the memory controller accepts from a host data belonging to one or more computer files or other host data-set items. The memory controller automatically identifies a portion of the data as belonging to a file (or other host data-set item) that is pre-specified as sensitive, such as an operating system Master File Table (MFT) or File Allocation Table (FAT) file whose corruption may have severe consequences on system performance. The memory controller stores the identified portion robustly using a relatively small number of bits per cell, and stores the data other than the identified portion using a higher number of bits per cell. The memory controller typically identifies the data portion in question independently of the host, i.e., without receiving any notification from the host that relates the data portion to the sensitive file.

In some disclosed techniques, the memory controller accepts memory access tasks (referred to as "threads") for execution from the host. The memory controller assigns execution priorities to the threads, independently of the host, and executes the threads in accordance with the execution priorities. The memory controller may apply various policies using the execution priorities, such as giving precedence to readout commands over other commands or giving precedence to selected memory regions over others.

In other disclosed techniques, the memory controller accepts one or more computer files from the host, and stores the files in the non-volatile memory. The memory controller identifies, automatically and independently from the host, a memory region holding data that logically belongs to one of the files but is not actually utilized by the host. In an example embodiment, the file comprises a MFT or FAT file, and the identified region comprises one or more NULL entries in the file. Having identified the unutilized region, the memory controller releases the region for use in memory management, such as for increasing the over-provisioning overhead.

System Description

FIG. 1 is a block diagram that schematically illustrates a host system 20, in accordance with an embodiment of the present invention. In the present example, system 20 comprises a mobile computing device such as a notebook or laptop computer. Alternatively, the methods and systems described herein can be used in other computing devices such as Personal Digital Assistants (PDAs), in mobile communication terminals such as mobile phones, or in any other suitable host system.

Host system 20 comprises a host processor 24. The host processor typically runs a certain Operating System (OS), and may run any desired number of software applications. Host system 20 comprises a non-volatile storage device, in the present example a Solid-State Disk (SSD) 32. SSD 32 comprises a host interface 36 for communicating with host processor 24, an SSD controller 40, and one or more non-volatile memory devices 44. Each memory device 44 comprises an array 48 of multiple analog memory cells 52. A Read/Write (R/W) unit 56 writes data into memory cells 52 of array 48, and retrieves data from the memory cells.

In the context of the present patent application and in the claims, the term "analog memory cell" is used to describe any memory cell that holds a continuous, analog value of a physical parameter, such as an electrical voltage or charge. Array 48 may comprise analog memory cells of any kind, such as, for example, NAND, NOR and Charge Trap Flash (CTF) Flash cells, phase change RAM (PRAM, also referred to as Phase Change Memory—PCM), Nitride Read Only Memory (NROM), Ferroelectric RAM (FRAM), magnetic RAM (MRAM) and/or Dynamic RAM (DRAM) cells. Flash memory devices are described, for example, by Bez et al., in "Introduction to Flash Memory," Proceedings of the IEEE, volume 91, number 4, April, 2003, pages 489-502, which is incorporated herein by reference. Multi-level Flash cells and devices are described, for example, by Eitan et al., in "Multilevel Flash Cells and their Trade-Offs," Proceedings of the 1996 IEEE International Electron Devices Meeting (IEDM), New York, N.Y., pages 169-172, which is incorporated herein by reference. The paper compares several kinds of multilevel Flash cells, such as common ground, DINOR, AND, NOR and NAND cells.

NROM cells are described by Eitan et al., in "Can NROM, a 2-bit, Trapping Storage NVM Cell, Give a Real Challenge to Floating Gate Cells?" Proceedings of the 1999 International Conference on Solid State Devices and Materials (SSDM), Tokyo, Japan, Sep. 21-24, 1999, pages 522-524, which is incorporated herein by reference. NROM cells are also described by Maayan et al., in "A 512 Mb NROM Flash Data Storage Memory with 8 MB/s Data Rate," Proceedings of the 2002 IEEE International Solid-State Circuits Conference (ISSCC 2002), San Francisco, Calif., Feb. 3-7, 2002, pages 100-101, which is incorporated herein by reference. FRAM, MRAM and PRAM cells are described, for example, by Kim and Koh in "Future Memory Technology including Emerging New Memories," Proceedings of the $24^{th}$ International Conference on Microelectronics (MIEL), Nis, Serbia and Montenegro, May 16-19, 2004, volume 1, pages 377-384, which is incorporated herein by reference.

The charge levels stored in memory cells 52 and/or the analog voltages or currents written into and read out of the memory cells are referred to herein collectively as analog values or storage values. The storage values may comprise threshold voltages, electrical charge levels, or any other suitable kind of storage values. R/W unit 56 stores data in the analog memory cells by programming the cells to assume respective memory states, which are also referred to as programming levels. The programming levels are selected from a finite set of possible levels, and each level corresponds to a certain nominal storage value. For example, a 2 bit/cell MLC can be programmed to assume one of four possible programming levels by writing one of four possible nominal storage values into the cell. Typically, R/W unit 56 converts data for storage in the memory device to analog storage values, and writes them into memory cells 52. When reading data out of array 48, R/W unit 56 converts the storage values of memory cells 52 into digital samples. Data is typically written to and read from the memory cells in groups that are referred to as pages. The R/W unit erases a block of cells 52 by applying one or more negative erasure pulses to the cells.

Some or all of the functions of SSD controller 40 may be implemented in hardware. Alternatively, SSD controller 40 may comprise a microprocessor that runs suitable software, or a combination of hardware and software elements. In some embodiments, SSD controller 40 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

The configuration of FIG. 1 is an exemplary system configuration, which is shown purely for the sake of conceptual clarity. Any other suitable memory system configuration can also be used. Elements that are not necessary for understanding the principles of the present invention have been omitted from the figure for clarity. In the example system configuration shown in FIG. 1, memory devices 44 and SSD controller 40 are implemented as two separate Integrated Circuits (ICs). In alternative embodiments, however, the memory devices and the SSD controller may be integrated on separate semiconductor dies in a single Multi-Chip Package (MCP) or System on Chip (SoC), and may be interconnected by an internal bus. Further alternatively, some or all of the SSD circuitry may reside on the same die on which one or more of the memory devices are disposed. Further alternatively, some or all of the functionality of SSD controller 40 can be implemented in software and carried out by host processor 24. In some embodiments, host processor 24 and SSD controller 40 may be fabricated on the same die, or on separate dies in the same device package.

In an example configuration of array 48, memory cells 52 are arranged in multiple rows and columns, and each memory cell comprises a floating-gate transistor. The gates of the transistors in each row are connected by word lines, and the sources of the transistors in each column are connected by bit lines. The memory array is typically divided into multiple pages, i.e., groups of memory cells that are programmed and read simultaneously. Pages are sometimes sub-divided into sectors. In some embodiments, each page comprises an entire row of the array. In alternative embodiments, each row (word line) can be divided into two or more pages. For example, in some devices each row is divided into two pages, one comprising the odd-order cells and the other comprising the even-order cells. In a typical implementation, a two-bit-per-cell memory device may have four pages per row, a three-bit-per-cell memory device may have six pages per row, and a four-bit-per-cell memory device may have eight pages per row.

Erasing of cells is usually carried out in blocks that contain multiple pages. Typical memory devices may comprise several thousand erasure blocks. In some two-bit-per-cell MLC devices, each erasure block is on the order of thirty-two word lines, each comprising several tens of thousands of memory cells. Each word line of such a device is often partitioned into four pages (odd/even order cells, least/most significant bit of the cells). Three-bit-per cell devices having thirty-two word lines per erasure block would have 192 pages per erasure block, and four-bit-per-cell devices would have 256 pages per block. Alternatively, other block sizes and configurations can also be used. Some memory devices comprise two or more separate memory cell arrays, often referred to as planes. Since each plane has a certain "busy" period between successive write operations, data can be written alternately to the different planes in order to increase programming speed.

Typically, host processor 24 reads and writes data in SSD 32 by specifying logical addresses of the data (e.g., using Logical Block Addressing—LBA). SSD controller 40 translates the logical addresses into respective physical storage locations in memory devices 44. Typically, the host processor is unaware of the actual physical storage locations in which the data is stored, and the logical-to-physical address translation may change over time.

Independent Memory Block Compaction in Separate Memory Regions

In some embodiments, each memory array 48 is partitioned into multiple memory blocks, each block comprises multiple pages, and SSD controller 40 stores data by writing data pages into the memory. In a typical Flash memory, data can be programmed page-by-page, but erasure can only be performed on entire blocks. Therefore, SSD controller 40 typically uses logical-to-physical address translation. In such a scheme, storage commands received from host processor 24 typically specify logical addresses. SSD controller 40 translates the logical addresses into physical storage locations in memory devices 44.

In particular, when the data of a certain logical page is updated, the SSD controller writes the new data in a new physical page (since the old physical page holding the old data of that logical page cannot be erased individually). Over time, more and more physical pages in the memory blocks of SSD 32 gradually become invalid, since their data was updated and stored in other physical pages.

SSD controller 40 typically applies a compaction process, which copies valid data from partially-filled memory blocks (referred to as source blocks) to new physical locations (referred to as destination blocks) in a compact manner. The compaction process, which is also referred to as "garbage collection," reduces regions of invalid data in the memory blocks and clears memory blocks for erasure and new programming.

In order to increase the efficiency of the garbage collection process, SSD 32 is typically over-provisioned in terms of memory size. In other words, the actual physical storage capacity of the SSD is larger than the specified logical capacity available to host processor 24. The aggregated size of the memory areas that do not hold valid data ("holes") is referred to as an over-provisioning overhead. The over-provisioning overhead can be specified as an over-provisioning ratio, which is defined as a fraction of the specified system capacity. For example, when the SSD uses an over-provisioning ratio of 5% and the memory is full from the host's perspective, each memory block is only 95% programmed, on average.

When SSD 32 is over-provisioned, garbage collection can be performed more efficiently. In other words, the number of copy operations per block compaction can be reduced. The efficiency of the garbage collection process increases as a function of the over-provisioning ratio used in the system. Thus, increasing the over-provisioning ratio reduces the wearing of memory cells, and also increases the programming throughput. The effect of the over-provisioning overhead on cell wearing and storage throughput is particularly strong when the memory is full or nearly full.

In some embodiments of the present invention, SSD controller 40 defines two or more separate regions in memory devices 44, and carries out a separate and independent compaction process within each region. Each region comprises multiple blocks, and may be defined in a single memory device 44 or in multiple memory devices 44. Any desired number of regions may be defined. The regions may be specified in terms of logical or physical addresses. Typically, SSD controller 40 maintains different over-provisioning ratios in different regions.

Figure 2:
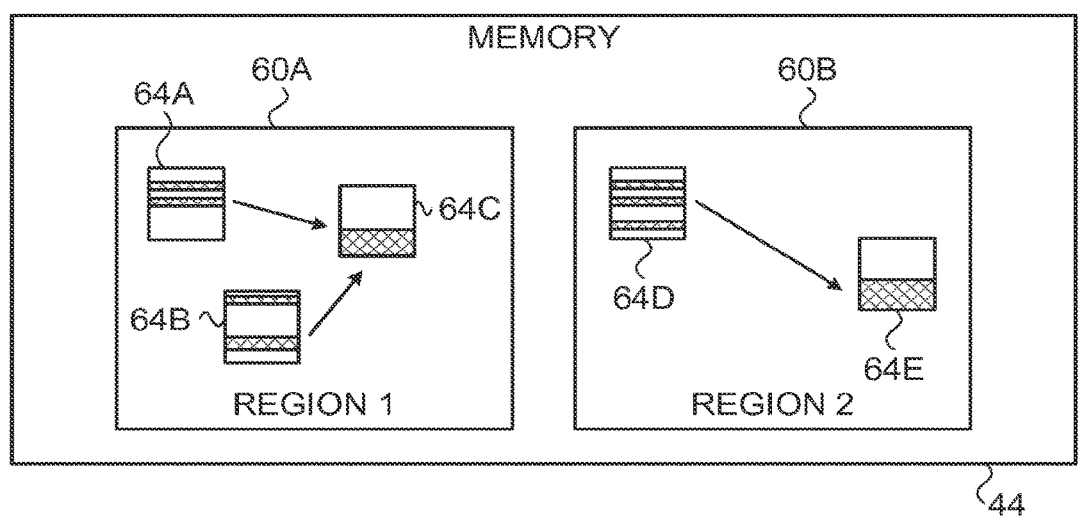
FIG. 2 is a diagram that schematically illustrates a process of compacting memory blocks, in accordance with an embodiment of the present invention.

FIG. 2 is a diagram that schematically illustrates a process of compacting memory blocks, in accordance with an embodiment of the present invention. In the present example, SSD controller 44 defines two memory regions denoted 60A and 60B in a certain memory device 44. Each region comprises multiple memory blocks. SSD controller 40 performs memory block compaction ("garbage collection") separately in each of the two regions, independently of the compaction process carried out in the other region. In the example of FIG. 2, in region 60A the SSD controller compacts two source blocks 64A and 64B into a destination block 64C. In region 60B, the SSD controller compacts a source block 64D into a destination block 64E.

Applying compaction separately in different regions, and in particular setting different over-provisioning ratios in different regions, may improve the performance of SSD 32. For example, different data types may have different characteristics, which can be exploited by matching the over-provisioning ratio to the data type.

In an example embodiment, SSD controller 40 may define one region for storing data that changes frequently, and another region for data that changes rarely. The SSD controller may set a relatively high over-provisioning ratio in the region holding the frequently-changing data, and a relatively low over-provisioning ratio in the region holding the rarely-changing data. Matching the over-provisioning ratio to the frequency at which the data changes provides an improved compromise between storage capacity and storage throughput. Although the example above refers to two regions (holding frequently-changing and rarely-changing data), the SSD controller may alternatively define three or more regions corresponding to three or more update frequencies of the data. Each such region may be provided with a different over-provisioning ratio.

In an alternative embodiment, SSD controller 40 defines one region for storing data that is written in a sequential manner, i.e., to blocks of data that are written to successive storage addresses, and another region for data that is written non-sequentially. The SSD controller may assign different over-provisioning ratios to the two regions, e.g., a lower over-provisioning ratio to the region holding sequentially-written data.

In some embodiments, SSD controller 40 adapts the over-provisioning ratios of different memory regions over time in an adaptive manner. For example, the SSD controller may track the frequency-of-use of various memory regions over time, and assign each memory region a respective over-provisioning ratio based on the current frequency-of-use of that region. Further aspects of adaptive over-provisioning are addressed in U.S. patent application Ser. No. 12/822,207, which is assigned to the assignee of the present patent application and whose disclosure is incorporated herein by reference.

In some embodiments, certain computer files that are used by the OS of host processor 24 are modified frequently. Frequently-changing files may comprise, for example, File System (FS) files that indicate file storage locations and other file attributes in the host processor's file system. Such files may comprise, for example, a Master File Table (MFT) or File Allocation Table (FAT) file. As another example, files that store e-mail messages, calendar entries and related information also change frequently. Such files may comprise, for example, Personal Storage Table (PST) or Offline Storage Table (OST) files.

In some embodiments, SSD controller 40 recognizes a certain file as a frequently changing file, and assigns a high over-provisioning ratio to the memory region in SSD 32 in which this file is stored. The SSD controller may recognize any of the file type examples given above, or any other suitable type of file that changes frequently. Memory regions that hold other files are assigned lower over-provisioning ratios.

In some embodiments, SSD controller automatically identifies the memory region in which the file in question is stored, e.g., by detecting a file header or other characteristic that is indicative of the sought file. The automatic identification in these embodiments is performed by the SSD controller without any indication or guidance from host processor 24 as to the storage location of the file. In alternative embodiments, SSD controller 40 recognizes the file by accepting an indication from host processor 24 as to the storage location of the file.

Figure 3:
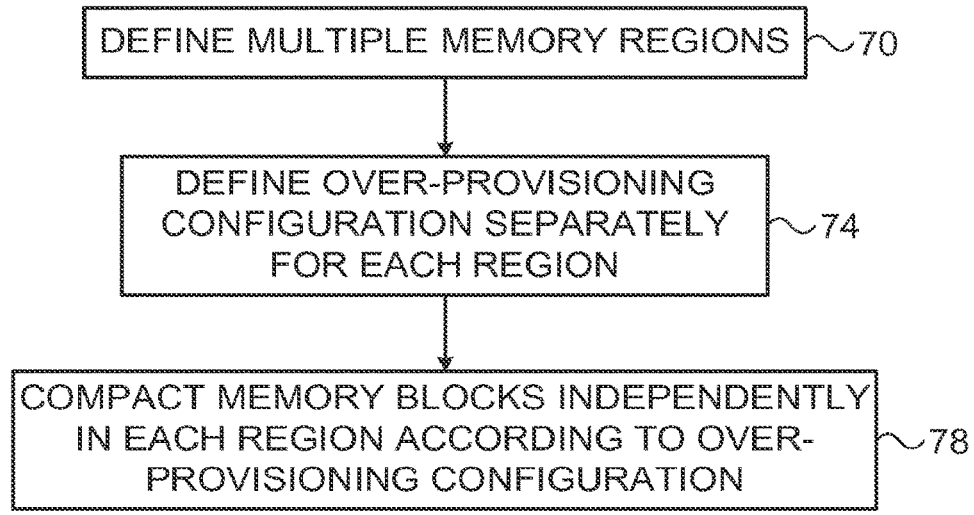
FIG. 3 is a flow chart that schematically illustrates a method for compacting memory blocks, in accordance with an embodiment of the present invention.

FIG. 3 is a flow chart that schematically illustrates a method for compacting memory blocks, in accordance with an embodiment of the present invention. The method begins with SSD controller 40 defining multiple memory regions in memory devices 44, at a region definition step 70. The SSD controller defines a separate over-provisioning configuration for each memory region, at an over-provisioning definition step 74. The SSD controller compacts memory blocks independently in each region, at a compaction step 78. The compaction in each region is performed in accordance using the over-provisioning overhead defined for that region, and independently of the compaction that takes place in other regions.

When carrying out the compaction process in a given region, SSD controller 40 may choose memory blocks for compaction using any suitable criterion. In an embodiment, the SSD controller chooses memory blocks for compaction depending on the wear level and/or endurance of the memory blocks. For example, the SSD controller may prefer to compact memory blocks that have gone through relatively few Programming and Erasure (P/E) cycles, and which are expected to have high endurance.

In some embodiments, the SSD controller modifies the logical-to-physical address mapping in order to equalize the wear levels of the different physical memory blocks. For example, if certain LBAs are updated frequently, the SSD controller may re-map these LBAs to other physical memory blocks, in order to equalize the wearing of memory cells.

Reliable Storage of Sensitive Files

Some computer files used by the OS of host processor 24 may be sensitive to errors. Errors in some files may have severe consequences on the host system functionality or performance. Sensitive files may comprise, for example, file-system files such as MFT and FAT files, e-mail files such as PST and OST files, or any other suitable file.

(Some host systems may use various kinds of host data-sets that specify data-set items, not necessarily file systems that specify computer files. Host data-set items may comprise, for example, a file, a data structure, or any other suitable data item. In a given host data-set, certain data-set items may be regarded as sensitive. Although the example embodiments described herein refer mainly to computer files, the disclosed techniques can be used for reliable storage of any other suitable kind of host data-set items in any other suitable kind of host data-set.)

In some embodiments, SSD controller 40 automatically identifies incoming data that belongs to a file that is pre-specified as sensitive, and stores this data in a robust manner that is resilient to errors. This identification is carried out independently of the host, i.e., without relying on any notification from the host that relates the data to the sensitive file. For example, the SSD controller may store sensitive files using a small number of bits per cell, in comparison with the number of bits per cell used for storing other data. In an example embodiment, the SSD controller may store the data of a sensitive file at a density of one or two bits-per-cell, and store other data at a density of three bits-per-cell.

Figure 4:
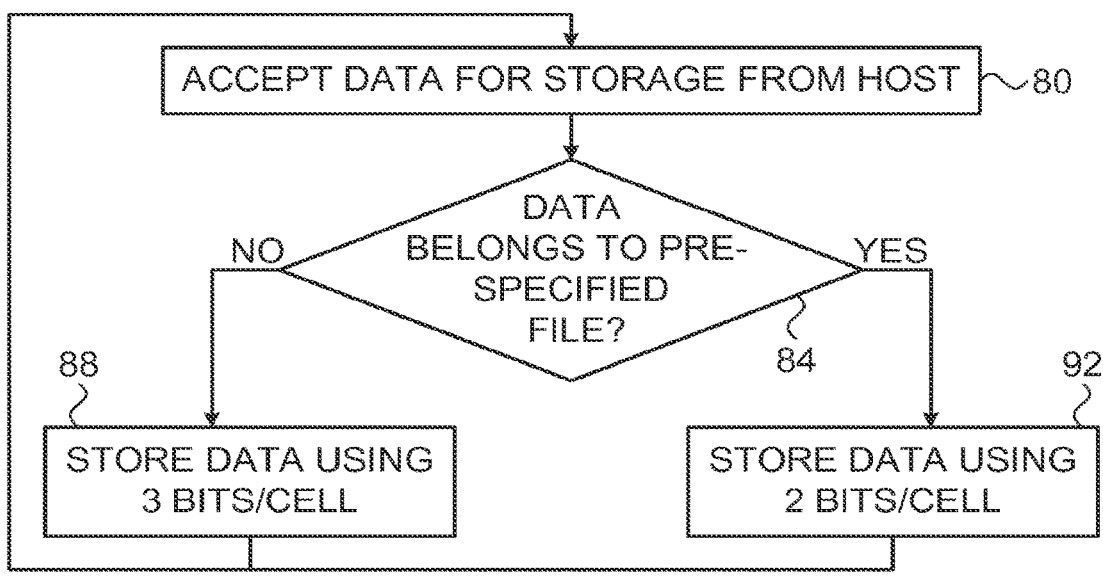
FIG. 4 is a flow chart that schematically illustrates a method for data storage, in accordance with an embodiment of the present invention.

FIG. 4 is a flow chart that schematically illustrates a method for data storage, in accordance with an embodiment of the present invention. The method begins with SSD controller 40 accepts data for storage from host processor 24, at a data input step 80. The SSD controller checks whether the accepted data belongs to a sensitive file that was pre-specified for robust storage, at a checking step 84. If the data does not belong to a sensitive file, the SSD controller stores the data at a density of three bits-per-cell, at a normal storage step 88. If, on the other hand, the data is identified as belonging to a pre-specified sensitive file, the SSD controller stores the data at a density of two bits-per-cell, at a robust storage step 92.

The SSD controller may identify incoming data as belonging to a sensitive file using any suitable method, e.g., by identifying a file header or other characteristic data pattern.

Host-Independent Prioritization of Memory Access Tasks

In some embodiments, host processor 24 sends multiple memory access tasks to SSD controller 40 for execution in SSD 32. Each memory access task is referred to as a tag or thread, and may comprise, for example, a read command or a write command. The terms "memory access task," "task," "tag" and "thread" are all used interchangeably herein. The host processor sends subsequent threads without waiting for completion of previous threads, and the SSD controller has certain flexibility in defining the thread execution order.

In some embodiments, SSD controller 40 assigns execution priorities to incoming threads independently of the host, and executes the threads in SSD 32 in accordance with the assigned execution priorities. In some embodiments, each memory access task is of a certain type, and the SSD controller assigns the priority of each memory access task based on its type.

In an embodiment, SSD controller 40 assigns a high priority to readout tasks (i.e., to memory access tasks that request data readout from the memory), and lower priority to other tasks (e.g., programming tasks and status request tasks). In these embodiments, when multiple tasks are pending, the SSD controller gives precedence to execution of pending readout tasks. In many system configurations it is advantageous to give high priority to readout tasks, since the requested data may be needed for immediate use by the host system. Programming tasks are often less sensitive to delay, for example because the data to be programmed is already cached.

In another embodiment, the SSD controller assigns high priority to tasks relating to certain storage addresses. In an example embodiment, the SSD controller assigns high priority to one or more ranges of Logical Block Addresses (LBAs), and lower priorities to other LBAs. Memory access tasks relating to the high-priority LBAs will be executed first, at the expense of higher execution latency for memory access tasks relating to other LBAs.

In yet another embodiment, SSD controller 40 assigns high priority to tasks relating to certain files or file types. High-priority files may comprise, for example, file-system files such as MFT or FAT files, e-mail files such as PST or OST files, or any other suitable file type. SSD controller 40 will execute tasks relating to the high-priority files first, at the expense of higher execution latency for tasks relating to other files.

In alternative embodiments, SSD controller 40 may assign priorities to memory access tasks independently of the host processor based on any other suitable criteria. In some embodiments, the SSD controller may modify the priorities adaptively over time. For example, the SSD controller may identify, e.g., using statistical analysis, which memory regions are most important to the host processor, and increase the relative priority of tasks relating to these regions.

Figure 5:
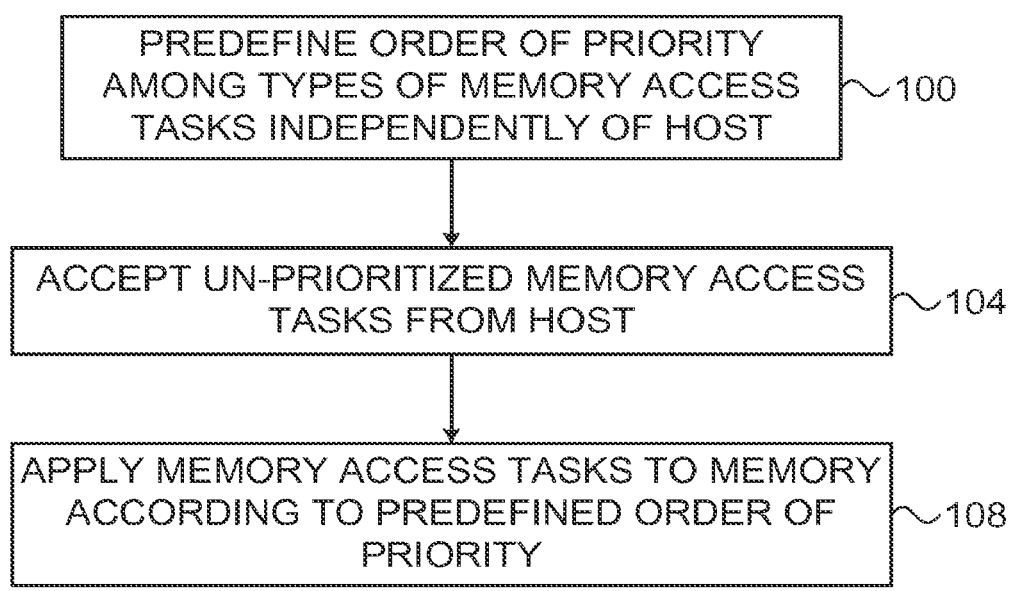
FIG. 5 is a flow chart that schematically illustrates a method for prioritized access to memory, in accordance with an embodiment of the present invention.

FIG. 5 is a flow chart that schematically illustrates a method for prioritized access to memory, in accordance with an embodiment of the present invention. The method begins with SSD controller 40 defining execution priorities for different types of memory access tasks, at a priority definition step 100. The SSD controller assigns the execution priorities independently of the host processor.

SSD controller 40 accepts from host processor 24 memory access tasks for execution in SSD 32, at a task input step 104. Each accepted task belongs to one of the above-defined types, and the host processor typically does not define execution priorities for the tasks. SSD controller 40 executes the accepted tasks in SSD 32, at a task execution step 108. The SSD controller executes the tasks in accordance with the execution priorities defined at step 100 above.

In some embodiments, SSD 32 is highly efficient in executing sequences of read commands or sequences of write commands, but is less efficient in executing sequences of intermixed read and write commands. In some embodiments, SSD controller 40 prioritizes the execution of memory access tasks such that multiple tasks of the same type (e.g., multiple readout tasks or multiple programming tasks) are executed consecutively. As a result, the overall throughput and efficiency of SSD 32 is improved.

In some embodiments, SSD controller 40 applies this sort of prioritization by queueing readout commands and programming commands in separate queues, and then selecting between the queues based on a certain selection criterion. The criterion typically causes the SSD controller to execute multiple readout tasks consecutively, or multiple programming tasks consecutively.

Figure 6:
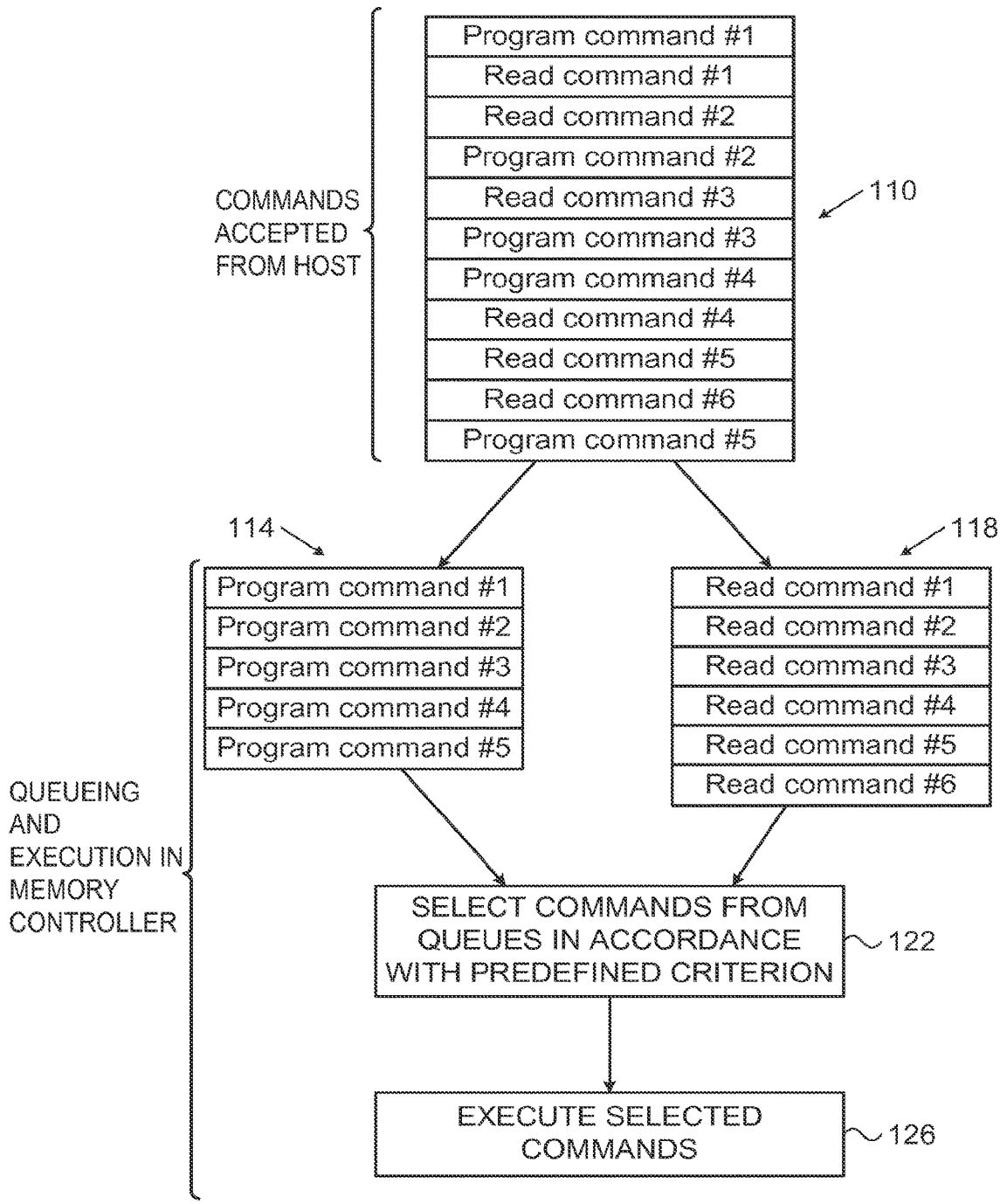
FIG. 6 is a diagram that schematically illustrates a process of prioritized execution of programming commands and read commands, in accordance with an embodiment of the present invention.

FIG. 6 is a diagram that schematically illustrates a process of prioritized execution of programming commands and read commands, in accordance with an embodiment of the present invention. A list 110 shows a sequence of memory access tasks in the order they are provided to SSD controller 40 by host processor 24. The example list comprises five programming commands and six readout commands.

SSD controller 40 separates the readout commands from the programming commands, and stores the programming commands in a write queue 114 and the readout commands in a read queue 118. At a selection step 122, the SSD controller selects the next task for execution from one of queues 114 and 118.

The selection criterion typically forms sequences of programming commands, and/or sequences of readout commands. For example, the selection criterion may define an order that serves M successive programming commands from queue 114, then N successive readout commands from queue 118, and so on. Selection of M and N enables setting of various trade-offs between execution efficiency and amount of re-ordering. Selection of M and N also enables setting different relative priority for readout commands vs.

programming commands. At an execution step 126, the SSD controller executes the commands selected from the two queues.

As noted above, in some embodiments the SSD controller gives precedence to execution of readout tasks over other tasks. The queuing configuration of FIG. 6 can be used to implement this sort of prioritization, as well.

Host-Independent Trimming of Unused Memory Regions

In some embodiments, host processor 24 sends computer files for storage in SSD 32, and SSD controller stores the files in memory devices 44. In some practical scenarios, some portions of the computer files are not actually utilized by the host processor. In some cases, certain regions in memory devices 44 logically belong to a valid computer file but do not contain data that is actually utilized by the host processor. In other cases, a file has been deleted (or rewritten to different logical addresses) by the host, leaving behind unutilized memory regions. In some embodiments, SSD controller 40 automatically identifies such unutilized memory regions, and releases ("trims") them for use in memory management while continuing to hold the file in question in memory.

For example, in some embodiments the host processor stores a MFT or FAT file, which indicates storage locations and other attributes of files stored in SSD 32. Real-life MFT and FAT files often comprise many NULL entries that do not represent any active file. The NULL entries occupy storage space, but are not actually accessed by the host processor.

In some embodiments, SSD controller 40 automatically identifies the storage locations used for storing the MFT or FAT file, and identifies the NULL entries in the file. The identification of the storage locations and NULL entries is typically performed by the SSD controller independently of the host processor, i.e., without using any indication from the host processor as to the storage locations or NULL entries of the file.

Having identified the memory regions that hold the unutilized portions of the file, SSD controller 40 releases these memory regions for use in memory management. The released memory regions can be used, for example, as an additional over-provisioning overhead, or for any other suitable memory management function.

Although the embodiments described herein refer to MFT or FAT files, the disclosed technique can be used to release unutilized memory areas that logically belong to any other suitable file.

Figure 7:
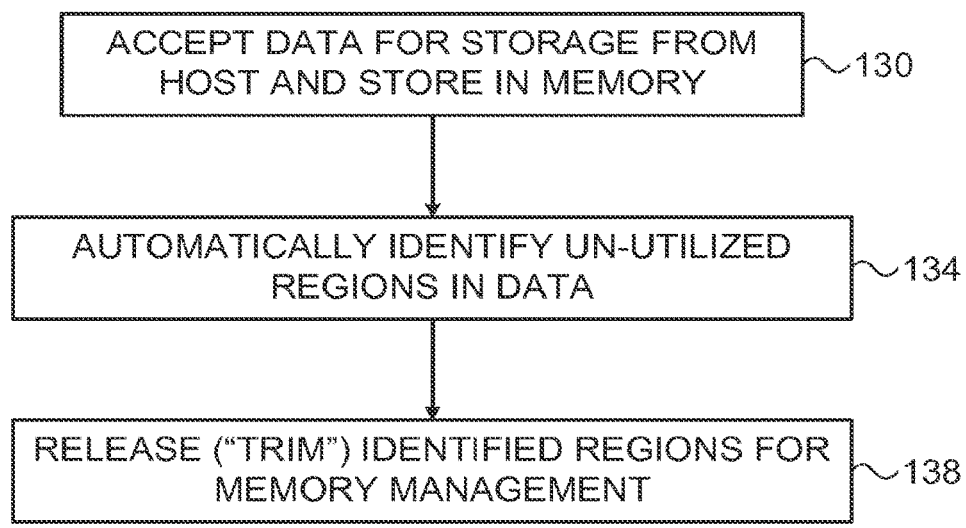
FIG. 7 is a flow chart that schematically illustrates a method for automatic releasing of unutilized memory regions, in accordance with an embodiment of the present invention.

FIG. 7 is a flow chart that schematically illustrates a method for automatic releasing of unutilized memory regions, in accordance with an embodiment of the present invention. The method begins with SSD controller 40 accepting from host processor 24 data of one or more computer files for storage in SSD 32, at a file input step 130. The SSD controller stores the accepted data in memory devices 44.

The SSD controller automatically identifies memory regions that hold portions of the files that are not utilized by the host processor, at a region identification step 134. This identification is typically carried out independently of the host processor. The SSD controller then releases ("trims") the identified memory regions, at a trimming step 138. The released memory regions are made available for increasing the over-provisioning ratio in SSD 32, or for carrying out any other memory management task by SSD controller 40.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
in a memory controller that stores data for a host in a memory, assigning execution priorities for two or more types of memory access tasks to be applied to the memory, wherein the memory includes a plurality of regions;
wherein assigning the execution priorities includes:
 prioritizing memory access tasks relating to an electronic mail file;
 storing readout memory access tasks in a first queue;
 storing write memory access tasks in a second queue; and
 consecutively executing, by the memory controller, a first number of readout memory tasks from the first queue based upon the execution priorities;
performing a statistical analysis of each region of the plurality of regions made over time;
identifying a particular region of the plurality of regions using results of the statistical analysis of each region of the plurality of regions, and increasing an execution priority of a task relating to the particular region;
accepting multiple un-prioritized memory access tasks submitted by the host to the memory controller, each of the multiple un-prioritized memory access tasks belonging to a respective one of the two or more types of memory access tasks; and
applying the memory access tasks to the memory in accordance with execution priorities.

2. The method according to claim 1, wherein assigning the execution priorities includes prioritizing memory readout tasks over tasks other than the memory readout tasks.

3. The method according to claim 1, wherein assigning the execution priorities includes prioritizing memory access tasks relating to selected storage addresses over the memory access tasks relating to storage addresses other than the selected storage addresses.

4. The method according to claim 1, wherein assigning the execution priorities includes consecutively executing, by the memory controller, a second number of write memory access tasks from the second queue based upon the execution priorities and in response to determining the execution of the first number of readout memory access tasks has completed belonging to a given type.

5. An apparatus, comprising:
an interface, which is configured to accept from a host unprioritized memory access tasks for execution in a memory, wherein the memory includes a plurality of regions; and
a processor, which is configured to:
 assign execution priorities for two or more types of the memory access tasks;
 perform, over time, a statistical analysis of each region of the plurality of regions;
 accept multiple un-prioritized memory access tasks submitted by the host, each of the multiple unprioritized memory access tasks belonging to a respective one of the two or more types of memory access tasks;
apply the multiple un-prioritized memory access tasks to the memory in accordance with execution priorities;
identify a particular region of the plurality of regions using results of the statistical analysis of each region of the plurality of regions; and
increase an execution priority of a task relating to the particular region; and
wherein to assign the execution priorities, the processor is further configured to:
prioritize memory access tasks relating to an electronic mail file;
store readout memory access tasks in a first queue;
store write memory access tasks in a second queue; and
consecutively execute a first number of readout memory tasks from the first queue based upon the execution priorities.

6. The apparatus according to claim 5, wherein to assign the execution priorities, the processor is further configured to prioritize memory readout tasks over tasks other than the memory readout tasks.

7. The apparatus according to claim 5, wherein to assign the execution priorities, the processor is further configured to prioritize memory access tasks relating to selected storage addresses over the memory access tasks relating to storage addresses other than the selected storage addresses.

8. The apparatus according to claim 5, wherein to assign the execution priorities, the processor is further configured to consecutively execute a a second number of write memory access tasks from the second queue based upon the execution priorities and in response to a determination the execution of the first number of readout memory access tasks has completed.

* * * * *

UNITED STATES PATENT AND TRADEMARK OFFICE
CERTIFICATE OF CORRECTION

| | |
|---|---|
| PATENT NO. | : 9,753,644 B2 |
| APPLICATION NO. | : 14/164706 |
| DATED | : September 5, 2017 |
| INVENTOR(S) | : Avraham Meir et al. |

It is certified that error appears in the above-identified patent and that said Letters Patent is hereby corrected as shown below:

In the Claims

Claim 4, Column 14, Line 53, please delete "has completed belonging to a given type." and substitute --has completed.--.

Claim 8, Column 16, Line 12, please delete "execute a a second number" and substitute --execute a second number--.

Signed and Sealed this
Sixth Day of February, 2018

Joseph Matal
*Performing the Functions and Duties of the*
*Under Secretary of Commerce for Intellectual Property and*
*Director of the United States Patent and Trademark Office*